United States Patent

Ranalli et al.

[19]

[11] Patent Number: 6,081,588
[45] Date of Patent: *Jun. 27, 2000

[54] METHOD AND APPARATUS FOR OBTAINING ALTERNATE DELIVERY INSTRUCTIONS FOR A FAX DOCUMENT

[76] Inventors: Douglas J. Ranalli; Shelley J. Ranalli, both of 67 Hammond St., Cambridge, Mass. 02138; Valerie Louise Johns, 40 Swarthmore Rd., Wellesley, Mass. 02181; Naoko Ishibashi, 662 Linden st., Boylston, Mass. 01550; Martha Tassinari, 34 Ashton St., Beverly, Mass. 01915

[*] Notice: This patent is subject to a terminal disclaimer.

[21] Appl. No.: 09/088,221

[22] Filed: Jun. 1, 1998

Related U.S. Application Data

[63] Continuation of application No. 08/713,871, Sep. 13, 1996, Pat. No. 5,761,284.

[51] Int. Cl.[7] .............................. H04M 11/00; H04N 1/00
[52] U.S. Cl. ...................................... 379/100.09; 358/407
[58] Field of Search ..................... 379/100.01, 100.03, 379/100.06, 100.08–100.09, 100.11, 100.13–100.14, 100.17, 93.15; 358/400, 402–403, 407, 434–435, 438–440, 442

[56] References Cited

U.S. PATENT DOCUMENTS

| | | | |
|---|---|---|---|
| 4,994,926 | 2/1991 | Gordon et al. | 379/100.09 |
| 5,581,757 | 12/1996 | Maxey | 358/407 |

*Primary Examiner*—Curtis A. Kuntz
*Assistant Examiner*—George Eng
*Attorney, Agent, or Firm*—Bruce A. Kaser

[57] ABSTRACT

Method and apparatus for obtaining alternate delivery instructions to enable reliable delivery of a fax document. A set of delivery instructions (DI) are maintained for each of a plurality of destinations. When a fax has been successfully sent to a destination, it is determined whether the DI are complete for the destination. If not, a DI fax is prepared requesting an alternate fax number or confirmation that no alternate fax number exists. Then, the DI fax is sent to the destination, and upon receipt of a response to the DI fax from the destination, the DI for the destination are updated.

18 Claims, 4 Drawing Sheets

METHOD AND APPARATUS FOR OBTAINING ALTERNATE DELIVERY INSTRUCTIONS FOR A FAX DOCUMENT

This application is a continuation of application Ser. No. 08/713,871 filed Sep. 13, 1996, for Method and Apparatus for Obtaining Alternate Delivery Instructions for a Fax Document, now U.S. Pat. No. 5,761,284.

FIELD OF THE INVENTION

The present invention concerns delivery of fax documents using a value-added network, such as a store-and-forward network, and more particularly to a method and apparatus for obtaining alternate delivery instructions.

BACKGROUND OF THE INVENTION

As a mechanism to carry information over long distances, store-and-forward (S&F) networks offer an efficient, low-cost alternative to the existing public switched telephone network (PSTN). In general, S&F networks operate parallel to, and are accessed by, the PSTN.

FIG. 1 shows schematically PSTN 14 and S&F network 22 connected in parallel between a source fax machine 10 and a destination fax machine 30. An autodialer 12, positioned between the source fax machine and PSTN 14, designates incoming faxes for transmission over either the PSTN 14 or S&F network 22. If for example the destination of the incoming fax is not one serviced by the S&F network, then the autodialer dials the destination telephone number directly to the local exchange 16; the call is then carried in a normal fashion by the PSTN 14 to the destination fax machine 30. In contrast, if the number is one serviced by the S&F network, the autodialer dials the telephone number corresponding to that of the source network node 24. The local exchange 16 then routes the call through the PSTN to the source node. (Note that, depending upon their proximity, the source fax machine 10 and the source network node 24 may be served by the same or different local exchanges.) Once it has completely received the document, the source node 24 transfers it to the destination network node 28 over dedicated circuit 26. At this point, the destination node 28 dials the destination telephone number to its local exchange which in turn transfers the call via the PSTN to the local exchange 20 and then to destination fax machine 30. (Note again that, depending upon their proximity, the destination fax machine 30 and the destination network node 28 may be served by the same or different local exchanges.)

In summary, transport of information from the source fax machine to the destination fax machine using the S&F network requires three distinct steps:

(1) from the source fax machine to the source network node via the PSTN;

(2) from the source node to the destination node via dedicated circuits; and (3) from the destination node to the destination fax machine, again via the PSTN.

Store-and-forward networks offer a number of significant advantages over standard telephone networks for transport of facsimile. For example, a fax document can be carried 15 times more efficiently using packet technology employed by S&F networks. A common annoyance in telephony is the inability to complete a call, usually because the destination device is busy or does not answer. Although sophisiticated voice mail systems have been designated to overcome this problem in voice telephony, similar practical and cost effective solutions do not exist for fax. S&F networks offer a viable solution. A properly implemented S&F network will employ a sufficiently large number of telephone circuits such that a customer fax machine never encounters a busy signal. At the destination end, it is a common practice to design into S&F networks the ability to automatically redial those call attempts which encounter "busy" or "no-answer" signals. Normally, the calls are redialed periodically over a fixed interval of time, every ten minutes for a half hour, for example.

Since multiple messages are typically coursing through an S&F network at any point in time, it is important to have some mechanism to monitor the location and status of each. For example, in one known S&F network, a small data file called an envelope is created to track each fax document as it moves through the network. The source node creates the envelope after it receives an incoming fax document. As the fax document moves through the network, the envelope moves between the network devices and receives continuous updates regarding the status of the fax. This enables substantially real-time monitoring of the fax delivery process.

In the known S&F network, upon concluding the delivery attempt process, the destination network node declares the fax document either "delivered" or "not delivered"; it records the status in the corresponding envelope which is then returned to the source node. If the delivery was successful, the envelope is forwarded to an historical database (HD) which provides a basis for constructing customer bills. If the delivery was not successful, the envelope will be forwarded to a delivery assist system (DAS) for further processing. DAS is a database management system which provides a human operator, the document delivery analyst, with the delivery history and options for resubmission to the network of the document in question. One of the possible actions the analyst may take is to assign the fax to an alternate destination number, one that has been prearranged with either the sender or the receiver.

It is, of course, possible to ask the customer (source) of a given fax document for alternate delivery instructions, either before or after a problem is encountered with delivering a fax. However, obtaining alternate delivery instructions from a customer for every possible destination number is very time-consuming for both the customer and network provider; more importantly, it is likely to decrease the customer's perceived benefit of utilizing the S&F network. A request (to the customer) for alternate delivery information can certainly be postponed until a problem is encountered with a given destination number. This, however, may have the undesirable consequence of introducing a substantial delay before the document can be delivered, thus significantly degrading the guarantee of timely delivery offered by the network provider. Thus, there is a need for some means of obtaining alternate delivery information without alienating the customer or significantly delaying his otherwise undeliverable fax.

SUMMARY OF THE INVENTION

In accordance with the present invention, a method of obtaining alternate delivery instructions is provided, in order to furnish more reliable delivery of a fax document. A set of delivery instructions (DI) are maintained for a plurality of destinations. When a fax has been successfully sent to a destination, it is determined if the set of delivery instructions for that destination are complete. If not, a DI fax for the destination is prepared, which requests alternate delivery instructions such as an alternate fax number or confirmation that no alternate fax number exists. The DI fax is sent to the destination. Upon receipt of a response to the DI fax from the destination, the new DI is incorporated into the delivery assist system to aid future document resubmission processes.

One benefit of the invention is that because the destination has better knowledge of the local fax environment, it can generally provide more reliable delivery instruction information than the source. Secondly, the collection of such information is distributed in both time and place, as opposed to placing an undue burden on the source by requesting in advance a set of alternate delivery instructions for all destinations.

In particular embodiments, the request for delivery instructions (Di fax) can be sent at a scheduled time, for example to ensure delivery during business hours at the destination, and/or during off-peak hours when traffic on the network is lower (and presumably less expensive). The language of the DI fax (e.g., English, French, Japanese, etc.) can be selected to increase the likelihood of a response. Similarly, the DI fax may designate a particular country to which the response is to be sent, in order to increase the likelihood of a response.

In other embodiments, it may not be desirable to send a DI fax to certain destinations, and therefore the method may include a step of determining whether the source has authorized the sending of a DI fax to a particular destination. Different forms of the DI fax may be selected for different types of destinations and/or customers. A pre-formatted fax document to which appropriate data is merged may be available to automate the process.

Upon failing to receive a response to the DI fax, one or more additional delivery attempts of the DI fax may be made. If still no response is received, the system may contact the source of the fax for alternate delivery instructions.

These and other features and benefits of the present invention will be more particularly described in regard to the following detailed description and figures.

DETAILED DESCRIPTION

Figure 1:
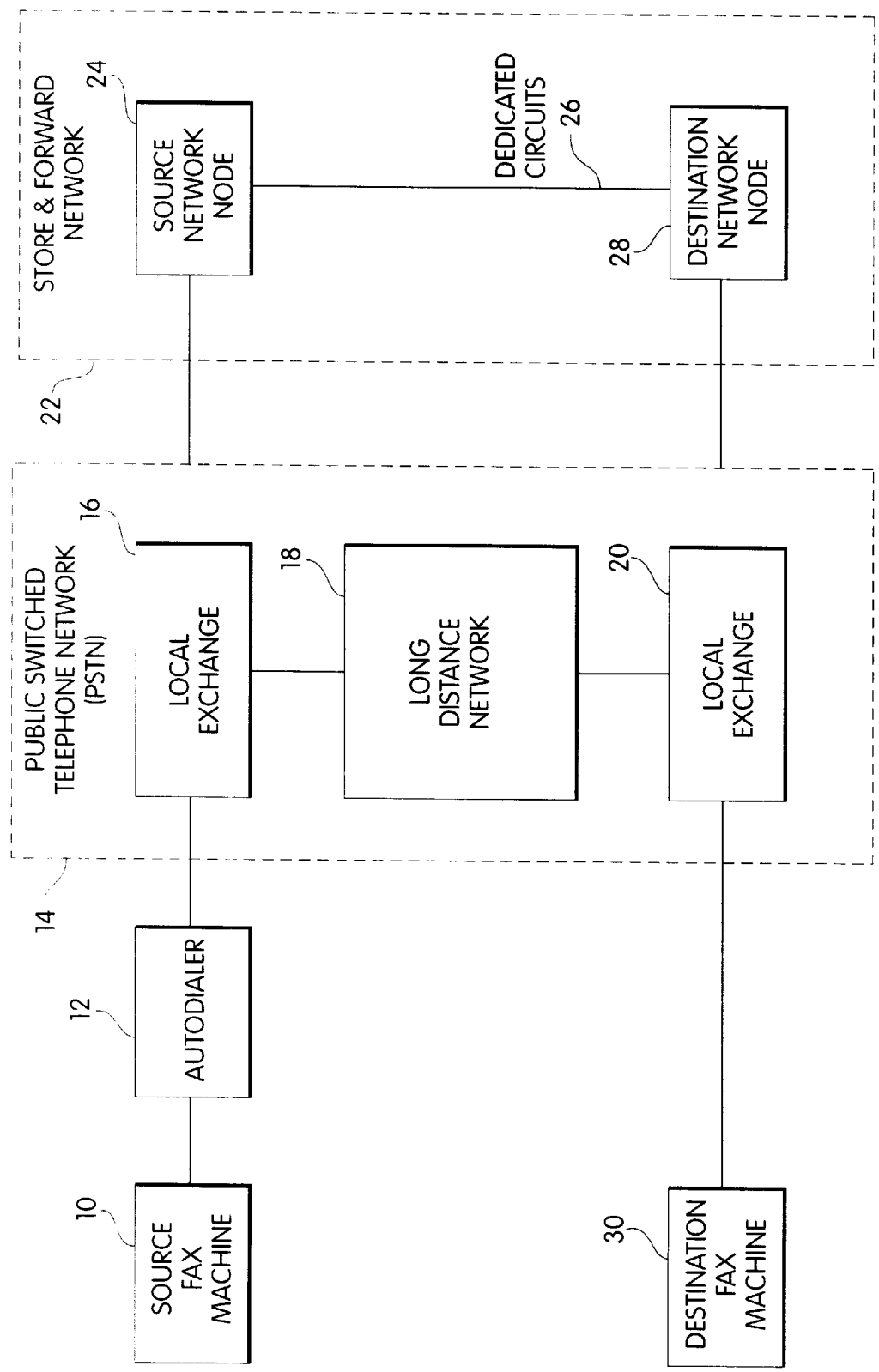
FIG. 1 is a schematic illustration of an S&F network disposed in parallel to a PSTN.

A standard S&F network node normally contains the following four key components:

1. Fax Transmit/Receive Agent (FTR)—As the name implies, this component is responsible for transmitting documents to and receiving documents from fax machines. Two principal software processes reside on this component. The first, a "vfax" process, controls the actual transmission and reception of a fax document. A second "scheduler" process controls the movement of the fax document and other auxiliary messages to the remaining key components.
2. Traffic Administrator (TA)—This component is responsible for monitoring and controlling the movement of the fax document through the S&F network once it leaves the FTR.
3. File Server (FS)—This machine is responsible for receiving the fax document from the FTR and storing it until it is notified that the document has either been successfully delivered or canceled.
4. Router—This machine manages the flow of information between and among the other machines which make up the network node. Further, it formats data and manages its transport to other nodes on the network.

In normal operation, upon detecting a ring signal from the telephone network, the source FTR goes off-hook and creates a vfax process which exchanges information with the calling autodialer. Upon validating the call, vfax creates two files with unique names: a fax file to hold the incoming fax and a companion file called an envelope. A complete envelope file contains a variety of information generally including the source fax machine number, the destination number, the number of pages in the document and the total reception time; that is, all the information required to deliver the fax and bill the customer. Once the files are created, vfax instructs the autodialer to allow it to interact directly with the source fax machine to initiate the fax reception process. It then begins to receive the fax data and store it in a local buffer under the created filename. Once reception is complete and the call terminated, both files are transferred to the scheduler; this process in turn transfers the fax file to the file server and then forwards the related envelope file to the source TA to begin the file routing process. Note that all this activity takes place within the source node.

The delivery process begins with an examination of the envelope to determine the document destination. The source TA decides on an appropriate route and forwards the envelope to the selected destination TA. From there, the envelope is relayed to a destination FTR to begin the delivery process. After retrieving the entire fax document from the source file server, the destination FTR dials the destination fax number to commence delivery.

In accordance with the present invention, a delivery instruction (DI) fax process is provided to simplify and automate the process of gathering delivery instructions for some or all of a customer's destination fax numbers. In accordance with this embodiment, the DI fax is a request for an alternate fax number or confirmation that no alternate fax number exists. Preferably, the DI fax further requests a phone number for reaching a person located at the destination via the PSTN.

It has been found that sending a DI fax to every "good" destination fax number (see later discussion of good fax numbers) for a particular customer proved to be effective in gathering alternate delivery instructions 50% of the time, representing 85% of that customer's overall fax traffic. Where the DI fax was not successful, the customer was contacted on a case-by-case basis as required to deliver their documents. A major benefit of the automated system according to the present invention is that it distributes the work of gathering delivery instructions to all of a customer's destination numbers, which dramatically simplifies the process of gathering such information and avoids placing an undue burden on the customer (the sender) to provide such information.

In accordance with a particular embodiment described herein, the method starts with the network provider signing up a customer anywhere in the world and attaching an autodialer device to each of the customer's fax machines. In this embodiment, the autodialer is programmed to route to the S&F network only numbers known to access fax machines; these numbers are stored in its internal database and are known as "good" numbers. A database of good fax numbers may be initially provided by the customer. Alternatively, the autodialer device may use its number qualification (NQ) capability to increase its store of good numbers. For example, the autodialer will route unknown numbers to the PSTN and monitor the call to determine if it terminates at a fax machine; if yes, the number is added to the good number database for future reference.

The network also maintains within the DAS a database of all good numbers with a set of delivery instructions for each. When the network has successfully delivered a document to a number which does not have a complete set of delivery instructions, the automated process of obtaining such delivery instructions will begin.

In summary, a document destined for a known good fax number enters the S&F network through the autodialer and in this case, is successfully delivered. Once the document is delivered, the system checks whether the delivery instructions are complete. If the delivery instruction status is incomplete for the given destination, a DI fax is prepared and scheduled to be sent to the destination. In this embodiment, a first DI fax is prepared in the English language and sent out by a network server to the destination. The DI fax arrives at the destination fax machine. The DI fax indicates a return fax number. An operator at the destination provides a responsive fax with the requested information and sends it to the return fax number. Upon receipt of the completed DI at the return number, the alternate delivery information is entered into the delivery instruction database. If no response is received within three days, a modified DI fax may be sent to the destination, in this case in the language of the destination. If still no response is received, the document may be sent to a document delivery department staffed by persons who will analyze the potential problem and attempt to obtain alternate means for delivering the fax (e.g., by telephoning a person at the destination).

Figure 2:
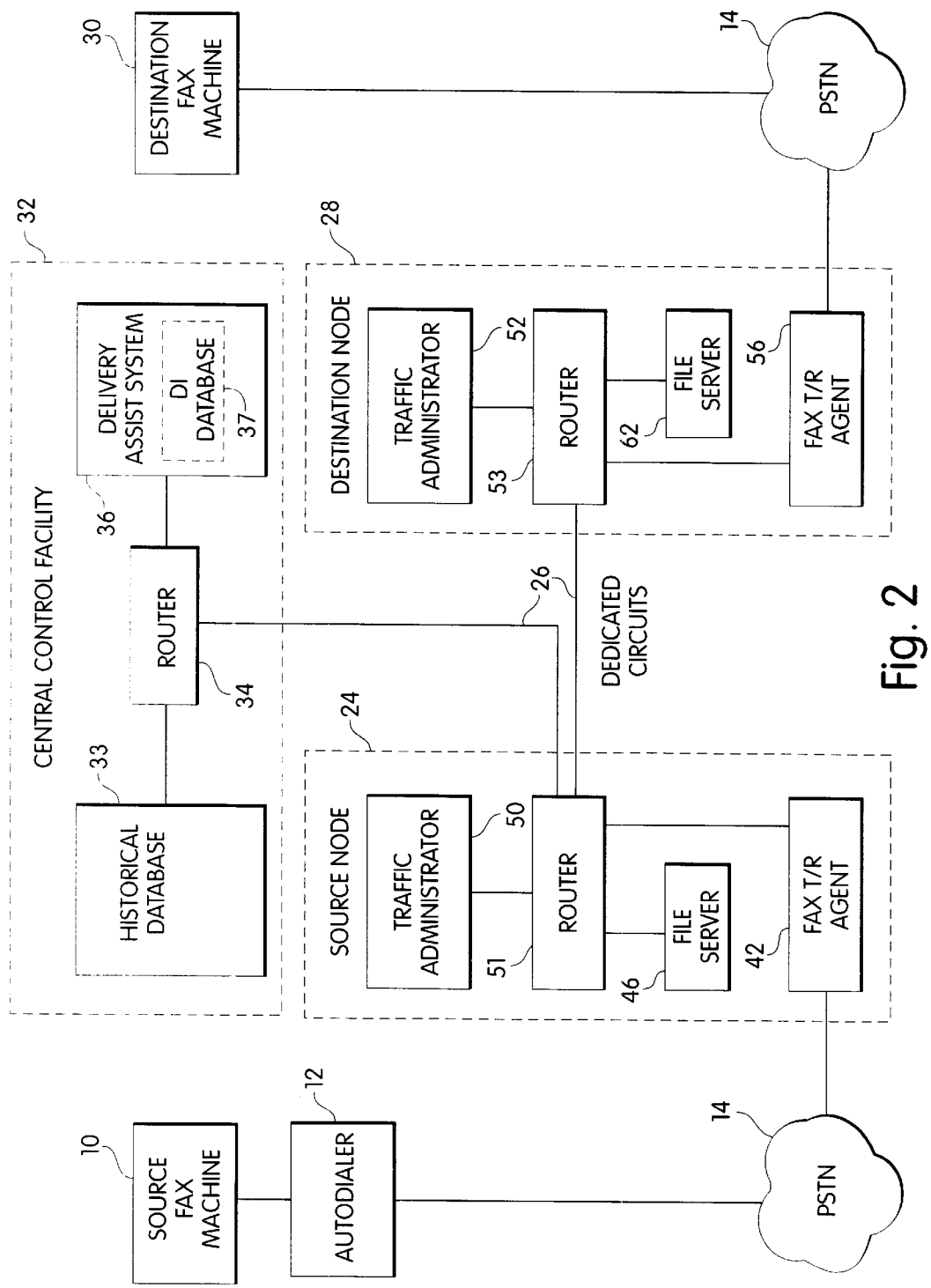
FIG. 2 is a schematic illustration of an apparatus for obtaining alternate delivery instructions according to the present invention.

The following is a particular embodiment of an apparatus and method for delivering a fax document in an S&F network (see FIGS. 1–2). In addition to the major components illustrated in FIG. 1, a Central Control Facility 32 is shown in FIG. 2 which is operated by the S&F network provider and which communicates via router 34 on dedicated circuits 26 with the source and destination nodes 24, 28 via routers 51 and 53, respectively. The automatic method of obtaining alternate delivery instructions according to the present invention may be incorporated into this general method and apparatus.

1. The customer loads a document into his fax machine 10 and dials the destination fax number.
2. The autodialer 12 attached to the customer's fax machine screens the dialed number. If it detects a valid destination phone number, it dials the network provider number (i.e., the telephone number of the source network node 24). The Public Switched Telephone Network (PSTN) 14 transfers the call to an FTR 42 at the source node.
3. The source FTR 42 answers and sends out a sequence of Dual Tone Multi Frequency (DTMF) tones on the PSTN to indicate its presence.
4. The autodialer 12 responds with a string of DTMF tones which indicate, among other information, an identifier of the source fax machine 10 (to which it is attached) and the destination fax number.
5. The source FTR 42 validates the received data and acknowledges its receipt with another DTMF signal to the autodialer 12.
6. The autodialer then removes itself from the circuit and the fax session progresses as if the customer's fax machine 10 is connected directly to the destination fax machine 30. In reality, the customer's fax document is entering the S&F network 22 for delivery.
7. When the source FTR 42 receives the fax, it creates a small data file called an envelope to contain information about the fax document. The envelope includes the following information:
   document number assigned by the source FTR to the fax document
   source fax machine identifier
   destination fax machine telephone number
   customer number.
8. After reception is complete, FTR 42 transfers responsibility for the document as follows:
   The fax document is transferred to the source File Server (FS) 46;
   The envelope is transferred to the source Traffic Administrator (TA) 50.
9. Once the source FTR 42 receives notification that the fax document and the envelope were transferred successfully, it deletes the fax document from its database.
10. To initiate the delivery process, the source TA 50 sends the envelope to the destination TA 52. The envelope residing on the destination TA is known as the destination envelope.
11. The destination TA 52 transfers the destination envelope to the least loaded destination FTR 56 to deliver the fax.
12. Upon receipt of the destination envelope, the destination FTR 56 retrieves a copy of the document from the source FS 46. The fax document is now ready for delivery.
13. In addition, the destination FTR 56 creates a document status update (DSU) containing detailed information about the status of the fax document it is holding for delivery. The destination FTR sends the updates to the destination TA 52 at regular (e.g., two-minute) intervals.
14. The destination TA 52 forwards the DSU to the source TA 50.
15. The source TA 50 uses the information in the DSU to update its copy of the fax envelope.
16. The destination FTR 56 attempts to deliver the document by calling the destination fax machine through the destination country's PSTN. The result of the attempt is either:
    Successfully Delivery—The document was delivered to the destination fax machine 30.
    Failed Attempt—The document was not delivered to the destination fax machine 30 because of one of the following conditions:
    Busy Line
    No Answer
    Broken Connection
    Non-Fax (for example, voice detected)
    Other (a general term assigned to a number of telephony or faxing errors).
17. Once the document is successfully delivered, the destination FTR 56 updates its copy of the envelope with the final delivery information and returns it to the destination TA 52. This machine then forwards the envelope to the source TA 50, which reconciles the information in the two envelopes and transfers the information to the historical database (HD) 33. At some later time the information will be retrieved from the system to compute a customer bill.

18. Informed that the document has been delivered, the source TA 42 sends a request to the FS 46 to delete the delivered document.

19. If the document is not successfully delivered on the first attempt, the destination FTR 56 makes additional delivery attempts at regular intervals over some predetermined time period—usually every five minutes for a half hour.

20. If these delivery attempts are unsuccessful, the destination FTR 56 declares the document as "Not Delivered," suitably marks the corresponding envelope, and sends it to the destination TA 52 for return to the source TA 50.

21. Noting the returned envelope as "Not Delivered," source TA 50 forwards it to the Delivery Assist System (DAS) 36 for resolution. DAS will review the delivery attempt history contained in the envelope to determine a course of action. In this case, it will search its Delivery Instruction (DI) database 37 for an alternative destination number. If one is found, the number is inserted in the envelope which is then resubmitted to the source TA for standard delivery. In the event that no alterntive number is available, the document will be referred to a Delivery Analyst (human operator) who determines a course of action to insure its successful delivery.

22. The Delivery Analyst may call the destination for more information, correct the telephone number and resubmit the document, reschedule delivery, or reroute the document to another fax machine. The Delivery Analyst enables the network provider to guarantee timely delivery of a fax document.

Figure 3:
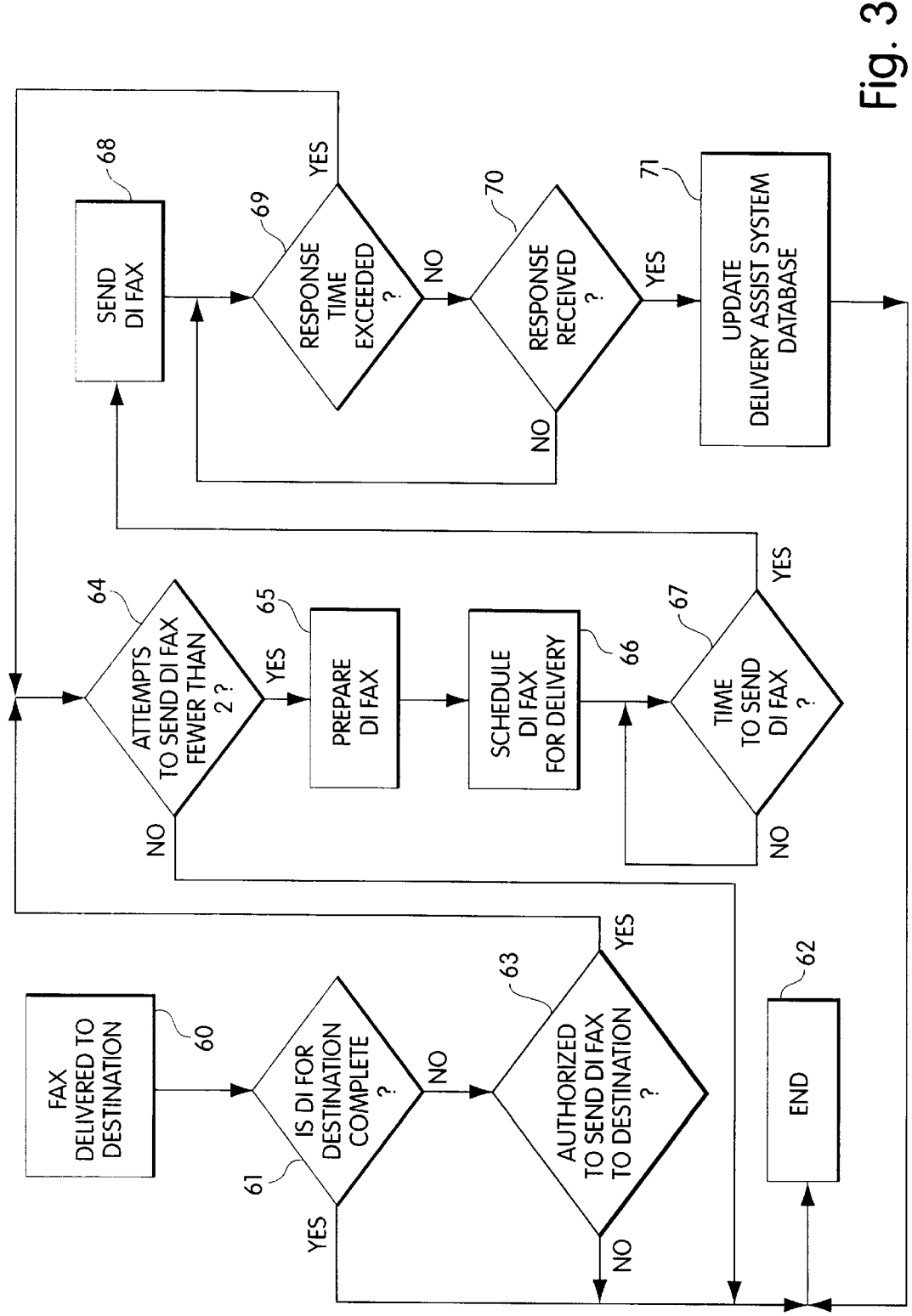
FIG. 3 is a flow chart describing the method of the invention.

FIG. 3 illustrates one method embodiment of obtaining alternate delivery instructions, following successful delivery of a fax to the destination. Initial step 60 indicates that a successful delivery of the fax to the destination has been made. In step 61, it is determined whether the delivery instructions (in the DI database) are complete. If yes, then the process ends (step 62). If not, then it is determined whether this destination number is authorized to receive a DI fax (step 63); generally, the customer is allowed to determine which destination numbers may be contacted via the DI fax process. If not authorized, the process ends (step 62). If authorized, it is determined whether two delivery attempts of a DIF to this destination have already been made. If so, then the process ends (step 62); some alternate method may then be used to obtain alternate delivery instructions. If less than two delivery attempts have been made, then a DI fax is prepared (step 65) and scheduled for delivery (step 66). If it is not yet the scheduled time (step 67), the process waits. When the scheduled time arrives, the DI fax is sent to the destination (step 68). The process waits a predetermined time period for a completed DI fax to be returned by the destination. After the predetermined time, if no response is received, the process may return to step 64 to initiate another DI fax, perhaps in a different language. If a response is received (step 70), then the alternate delivery instruction information in the response is used to update the DI database (step 71) and the process ends (step 72).

All DI faxes may be included in an auto-retry or auto-reschedule procedure and then terminated in the event they cannot be delivered via the automated process. Generally, it would not be desirable to use human intervention to deliver a DI fax. The results of a "failed" delivery attempt would then be returned.

The DI database 37, residing on the Delivery Assist System 36, should be updated as required to reflect the accurate status of each DI fax as it is created and moves through its lifecycle as follows:

Blank: No activity yet.

Scheduled: DI fax has been authored and is waiting for transmission.

Sent: DI fax has been sent into the network for delivery.

Delivered: DI fax was successfully delivered by the network to the destination number. Status change to take place after confirmation of delivery from network.

Received: DI fax was received back from the destination and either Partial or Complete DI was entered into the DI database.

Failed: DI fax was sent into the network but could not be delivered to the destination after going through a standard re-submission process and then was automatically terminated by the network.

All responses to DI faxes may be returned to special inbound ports on the network, and then routed to specific fax machines for printing. The network is thus used to aggregate the return responses and deliver the responses to a data entry group in paper or electronic form. The incoming delivery instructions are then entered into the DI database.

The above described embodiment may be implemented with a variety of hardware configurations. Note that the functionality of the principal network components including the TA, FTR, HD, DAS and the FS can be achieved in software applications executing on standard PC platforms. The choice, whether to use a few or many machines, is dependent upon the amount of traffic carried as well as the desired system reliability and redundancy.

Figure 4:
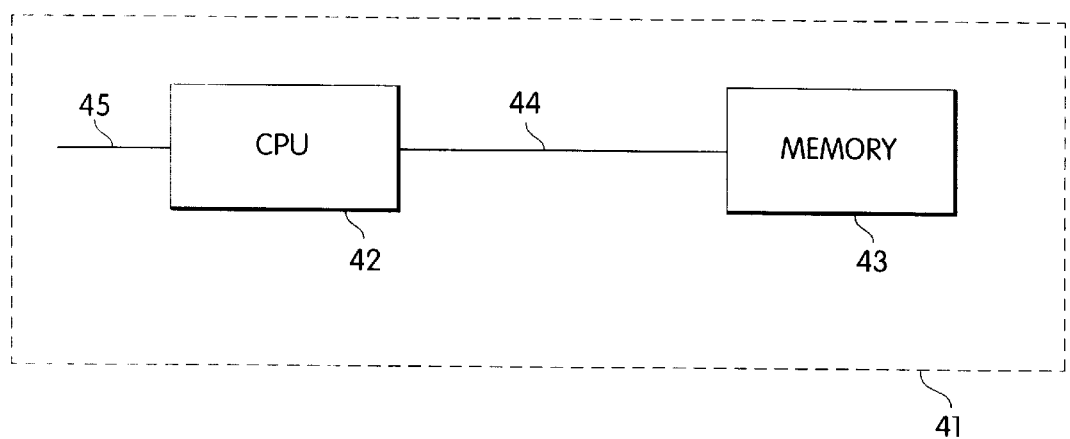
FIG. 4 is a block diagram illustrating a central processing unit and memory for use in this invention.

The invention may be implemented in a general purpose computer 41 as shown in FIG. 4. The general purpose computer may include a computer processing unit (CPU) 42, memory 43, a processing bus 44 by which the CPU can access the memory, and interface 45 to the network.

In alternative embodiments, the invention may be a computer apparatus which performs the functions of any of the previous embodiments. Alterntively, the invention may be a memory, such as a floppy disk, compact disk, or hard drive, that contains the computer program or data structure, for providing to a general purpose computer instructions and data for carrying out the functions of the previous embodiment.

These and other modifications and improvements of the present invention will be understood by a person skilled in the art and are intended to be included within the scope of the claimed invention.

What is claimed is:

1. An apparatus for obtaining alternate delivery instructions for a plurality of destination fax machines comprising:

means for maintaining a set of delivery instructions (DI) for each of a plurality of destinations;

means for determining if the DI are complete for the destination to which a fax has been successfully sent;

means for preparing a DI fax for the destination requesting alternate delivery instructions if the DI are not complete for the destination;

means for sending the DI fax to the destination;

means for updating the DI for the destination upon receipt of a response to the DI fax from the destination; and means for determining whether a source of the successfully sent fax has authorized sending the DI fax prior to preparing the DI fax.

2. The apparatus of claim 1, including means for selecting a language for the DI fax while preparing the DI fax.

3. The apparatus of claim 1 further comprising, means for preparing and sending a modified DI fax in a language different than a language of the initial DI fax if no response is received to the initial DI fax.

4. The apparatus of claim 1 further comprising, means for resending the DI fax after a predetermined interval during which no response is received.

5. The apparatus of claim 1 further comprising, means for storing each DI in a database.

6. The apparatus of claim 1 further comprising, means for entering data regarding the destination in a pre-formatted fax document when preparing the DI fax.

7. The apparatus of claim 1, including means for contacting a source of the successfully sent fax for alternative delivery instructions if no response to the DI fax is received in a predetermined time period.

8. The apparatus of claim 1 further comprising, means of sending the DI fax to the destination at a scheduled time.

9. The apparatus of claim 1, including means of updating the DI to indicate a failure of response upon failure to receive a response to the DI fax within a predetermined time period.

10. The apparatus of claim 1, further comprising means for the DI to include a request for a response at a fax number in a country of the destination.

11. The apparatus of claim 1, further comprising means for the DI fax to include a request for a response at a fax number in a country of a source of the successfully sent fax.

12. An apparatus for obtaining alternate delivery instructions for a plurality of destination fax machines comprising:

means for maintaining a set of delivery instructions (DI) for each of a plurality of destinations;

means for determining if the DI are complete for the destination to which a fax has been successfully sent;

means for preparing a DI fax for the destination requesting alternate delivery instructions if the DI are not complete for the destination;

means for sending the DI fax to the destination;

means for updating the DI for the destination upon receipt of a response to the DI fax from the destination; and means for the DI fax to request an alternative fax number or confirm that no alternate fax number exists.

13. The apparatus of claim 12 further comprising, means for the DI fax to further request a telephone number for contacting a person located at the destination.

14. The apparatus of claim 12 further comprising, means for entering information from the fax document into a database for storing each DI while updating the DI for the destination when the response is a fax document.

15. An apparatus for obtaining alternate delivery instructions for a plurality of destination fax machines comprising:

means for maintaining a set of delivery instructions (DI) for each of a plurality of destinations;

means for determining if the DI are complete for the destination to which a fax has been successfully sent;

means for preparing a DI fax for the destination requesting alternate delivery instructions if the DI are not complete for the destination;

means for sending the DI fax to the destination;

means for updating the DI for the destination upon receipt of a response to the DI fax from the destination; and means for the DI fax to request that the response be sent to a predetermined fax number.

16. The apparatus of claim 15, wherein the predetermined fax number is a destination on a predetermined network node.

17. The apparatus of claim 15 further comprising, means for utilizing the DI to attempt alternate delivery of the fax to the destination upon an unsuccessful attempt to send a fax to the destination.

18. The apparatus of claim 17 further comprising, means for attempting alternate delivery only after a predetermined number of unsuccessful attempts to deliver to the original destination fax number.

* * * * *